United States Patent

Tokui

[11] Patent Number: 5,552,846
[45] Date of Patent: Sep. 3, 1996

[54] CAMERA

[75] Inventor: Masaki Tokui, Kanagawa-ken, Japan

[73] Assignee: Olympus Optical Co. Ltd, Tokyo, Japan

[21] Appl. No.: 318,054

[22] Filed: Oct. 4, 1994

[30] Foreign Application Priority Data

Oct. 8, 1993 [JP] Japan .................................. 5-253285

[51] Int. Cl.⁶ .................................................. G03B 1/18
[52] U.S. Cl. ............................................... 354/173.1
[58] Field of Search ............................... 354/173.1, 212, 354/214

[56] References Cited

U.S. PATENT DOCUMENTS 4,522,477  6/1985  Iwashita et al. .
4,647,169  3/1987  Suzuki et al. .

FOREIGN PATENT DOCUMENTS

30813      7/1981   Japan .
2-67535    3/1990   Japan .
3-287150   12/1991  Japan .

Primary Examiner—Monroe H. Hayes
Attorney, Agent, or Firm—Louis Weinstein

[57] ABSTRACT

The present invention relates to a camera having a spool drive mechanism for pushing film loaded in a film cassette out of the cassette by rotating a spool. Herein, after a film cassette is mounted, when film is to be pushed out of the film cassette, a drive motor is rotated counterclockwise. A one-way clutch then couples a first pulley gear with a spool drive shaft, thus allowing the spool drive shaft to eject film. For rewinding film into the film cassette, the drive motor is rotated clockwise. This causes a pair of clutch elements to couple a helical gear with the spool drive shaft via the first pulley gear. Film is then rewound.

18 Claims, 5 Drawing Sheets

CAMERA

BACKGROUND OF THE INVENTION

1. Field of the Invention

The present invention relates to a camera. More particularly, this invention is concerned with a film transport mechanism for a camera which rotates forwardly or reversely a spool lying in a film cassette so as to feed film wound about the spool from the film cassette or to wind up or rewind the film.

2. Description of the Related Art

In a conventional camera in which a film cassette containing film up to a leader is mounted, a spool lying in the film cassette is rotated forwardly or reversely by means of a drive motor so that film wound about the spool is fed from the film cassette, or wound up or rewound.

In the past, various proposals have been made for a film transport mechanism for such a camera. For example, a film transport unit for a camera disclosed in Japanese Patent Laid-Open No. 3-287150 (1991) is a mechanism including a drive shaft coupled with one end of a spool in a film cassette and designed to drive and rotate the spool by means of an electric motor, and two systems of transmission routes that are provided by a planetary gear train. A rotational driving force transmitted from the electric motor via a rotation transmission system is directed to one of the two systems of transmission routes leading to the drive shaft projecting to the film cassette which is selected by a switching and transmitting means whose switching is controlled according to the direction of rotation of the electric motor. When driven and rotated by means of the driving force, the spool feeds film from the film cassette, winds it up, or rewinds it into the film cassette.

The film transport unit disclosed in the Japanese Patent Laid-Open No. 3-287150 has two planetary clutches attached to an L-shared lever. Thus, the mechanism is complex, and a large planar space is required as an area for movements. Besides a film cassette chamber occupies a large space. For realizing a compact camera, therefore, spaces above and below the film cassette chamber in a camera must be designed as small as possible. However, the complexity of the mechanism imposes limitations on the compactness.

A film transport unit for a camera disclosed in Japanese Patent Laid-Open No. 2-67535 (1990) has a driving force transmission route switching means made up of two one-way clutches and a planetary gear train. Herein, routes of transmitting a driving force to a spool in a cassette are switched according to a direction of rotation made by a drive motor, whereby film is fed, wound up, or rewound. For effecting the switching, a reduction ratio in film rewind speed is made larger than a reduction ratio in film take-up speed. This mechanism prevents the one-way clutches from transmitting the rotational motion enabling film rewind to a film take-up spool. A speed reduction ratio in a gear train for feeding film is made larger than the one in a gear train for taking up film. When film is fed and then wound about a take-up spool, since the take-up spool rotates at a higher speed, the one-way clutches that have been transmitting a driving force enabling film feed are freed.

In the film transport unit disclosed in the Japanese Patent Laid-Open No. 2-67535, however, the magnitudes of speed reduction ratios set in reduction gears restrain innovative designing. Even if an attempt is made to realize a small-sized mechanism by equalizing the speed reduction ratio in a film rewind with the one in a film feed and thus reducing the number of gears, the attempt fails.

An electric film rewind for a camera disclosed in Japanese Examined Utility Model Publication No. 56-30813 includes a clutch mechanism in which a helical gear and a constraining spring are used to allow an axis having the habit of turning in one direction to change directions of rotation made by a drive motor. Thus, gears are disengaged from each other and a member for transmitting a driving force enabling film rewind is clutched.

In the film transport unit disclosed in the Japanese Examined Utility Model Publication No. 56-30813, gears engage with each other as efficiently as with a small backlash ranging from 0.02 to 0.05 mm between them and transmit a driving force. When the clutch mechanism works, if the gears go up, one gear's timing of engaging with a mate may be inconsistent with the other's timing. In this case, the gears are struck off each other. Thus, the gears may not engage with each other very well.

OBJECTS AND SUMMARY OF THE INVENTION

An object of the present invention is to provide a camera that has a spool driving means for pushing film loaded in a film cassette out of the cassette by rotating a spool, and that incorporates a film transport mechanism having a small size and operating reliably in a highly stable manner.

A camera in accordance with the present invention has a spool driving means for pushing film loaded in a film cassette out of the cassette by rotating a spool, further comprising a motor rotatable in two directions, a spool drive shaft to be coupled with the spool, a first gear for ejecting the film from the cassette on receipt of a driving force generated by the motor, and a second gear for winding the film into the cassette on receipt of the driving force generated by the motor. For ejecting the film from the cassette, when the motor rotates in a first direction, a first clutch means couples the first gear with the spool drive shaft. For winding the film into the cassette, when the motor rotates in a second direction, a second clutch means couples the second gear with the spool drive shaft via the first gear.

Other features and advantages of the present invention will be fully apparent from the description below.

DETAILED DESCRIPTION OF THE PREFERRED EMBODIMENT

The present invention will be described in conjunction with an illustrated embodiment.

Figure 1:
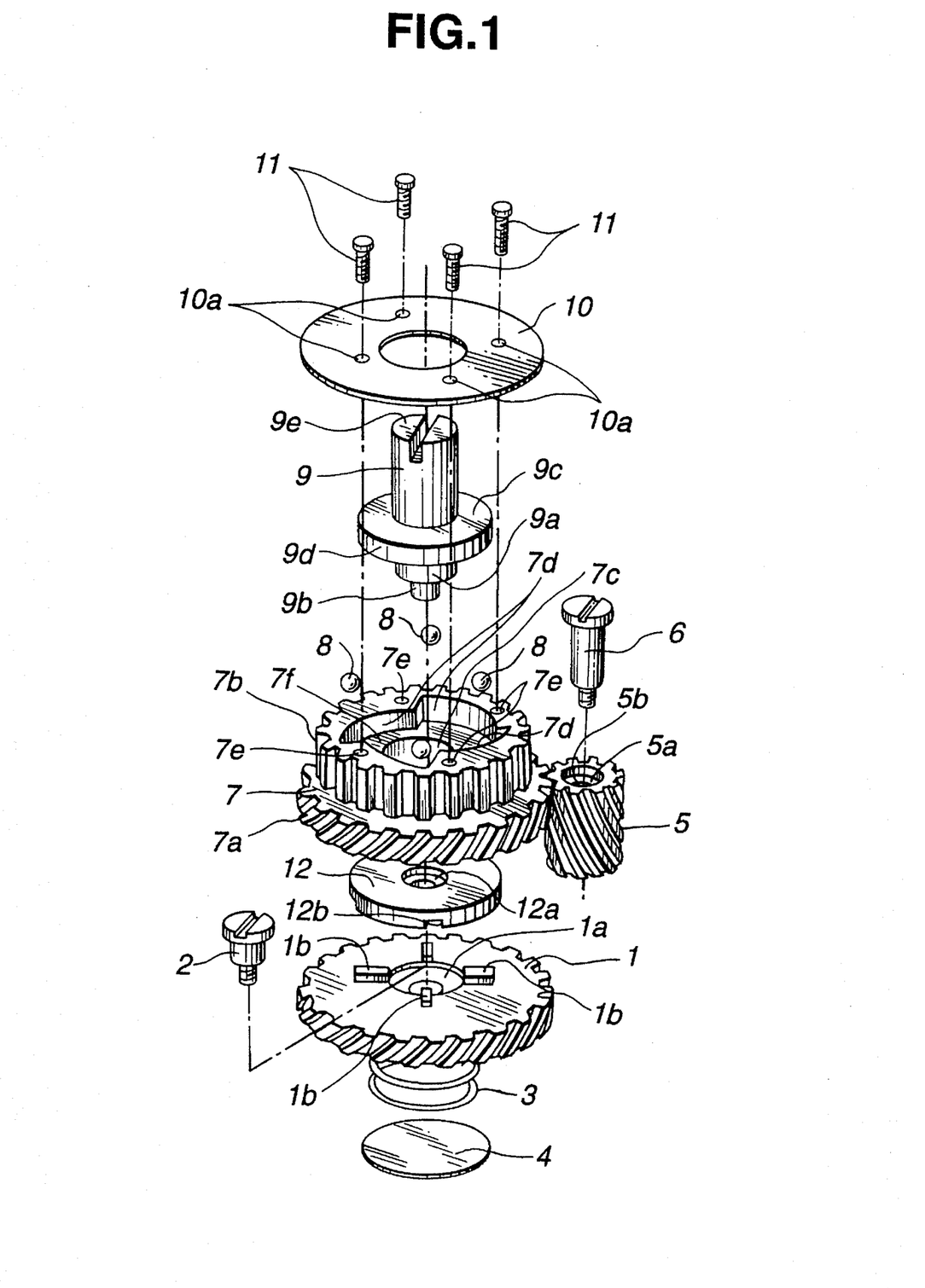
FIG. 1 is an exploded oblique view showing major components of a spool drive mechanism in a film transport mechanism incorporated in a camera of an embodiment of the present invention.
Figure 2:
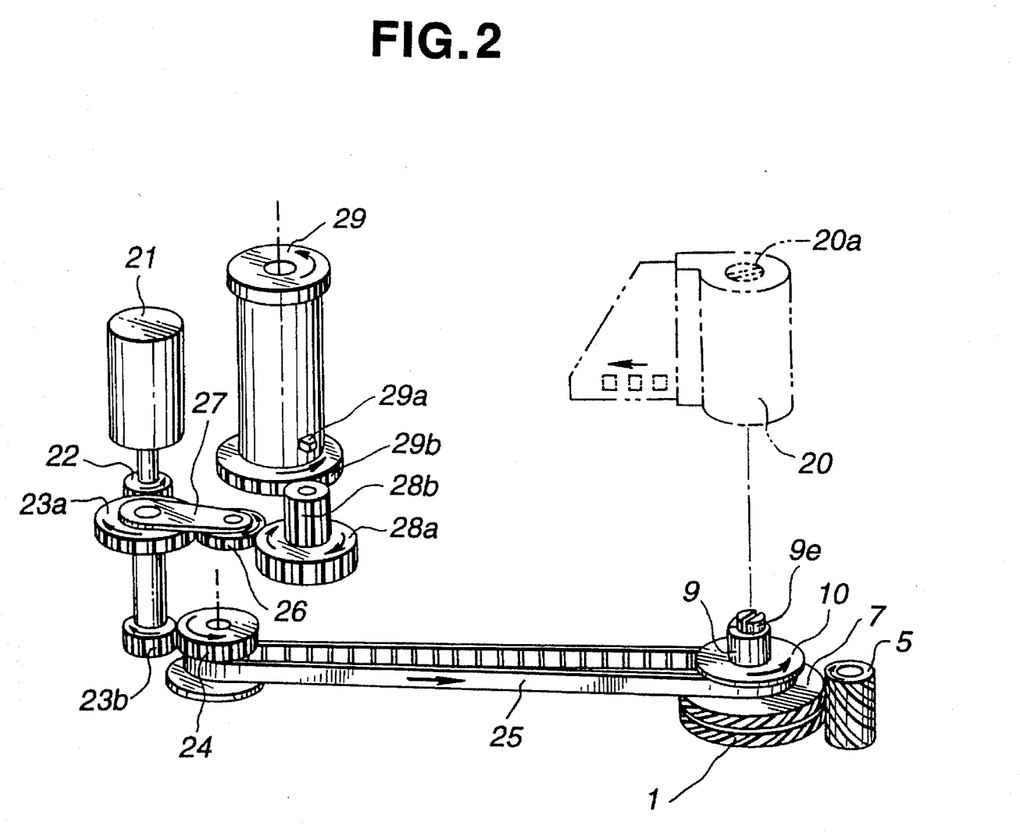
FIG. 2 is an oblique view showing the film transport mechanism in the camera of the embodiment which is feeding film.
Figure 3:
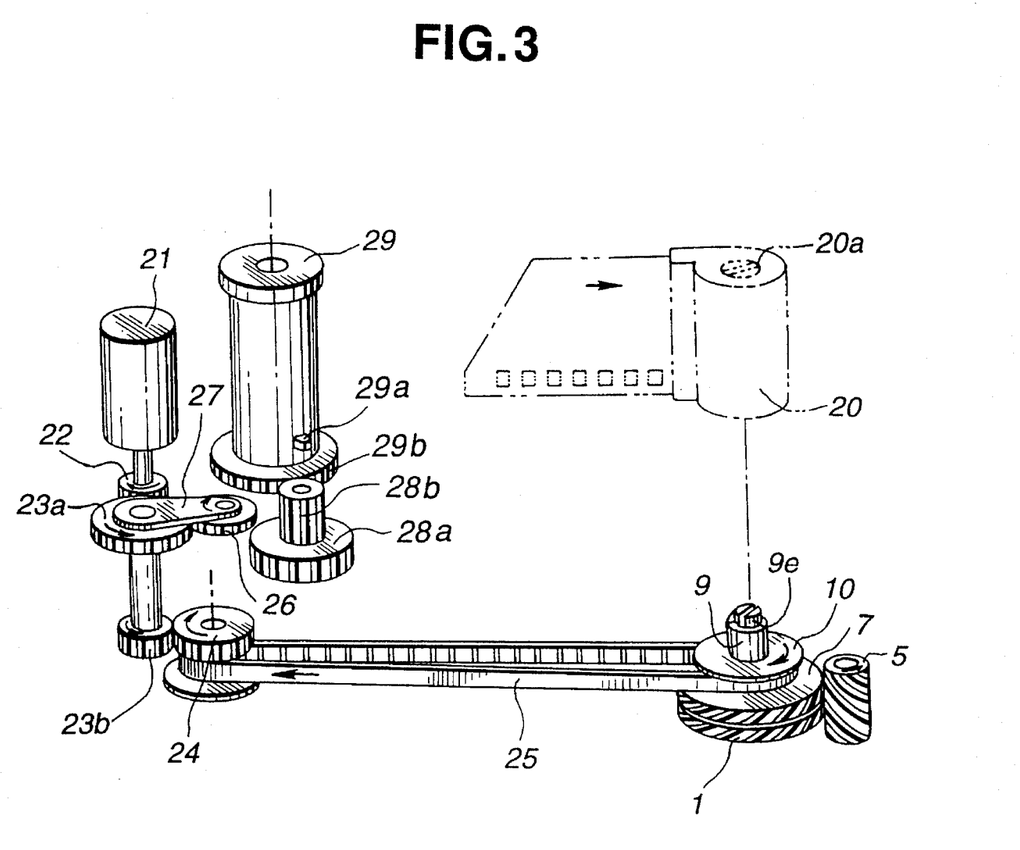
FIG. 3 is an oblique view showing the film transport mechanism in the camera of the embodiment which is rewinding film.

FIGS. 1 to 5 show a film transport mechanism incorporated in a camera of an embodiment of the present invention. FIG. 1 is an exploded oblique view showing a spool drive mechanism that is a major mechanism in the film transport mechanism for a camera. FIGS. 2 and 3 are oblique views respectively showing the film transport mechanism in states for feeding (i.e. winding up), and rewinding film.

To begin with, the spool drive mechanism serves as a spool driving means in the film transport mechanism for a camera of this embodiment.

The spool drive mechanism is a mechanism for pushing film loaded in a film cassette out of the cassette by rotating a spool.

In FIG. 1, a helical gear 1 serving as a second gear has a helical gear formed on the outer circumferential surface thereof and a circular stepped hole 1a bored in the center thereof. Along the circumference of the stepped hole 1a, four box-shaped projections 1b are formed radially and equidistantly, on the top of the helical gear 1. The projections 1b are fitted in four recesses 12b formed along the outer circumference of the bottom of a clutch plate 12 serving as a second clutch means and lying above the helical gear 1. The helical gear 1 is mounted in a base 103 (See FIGS. 4 and 5) located below the helical gear 1 or a locking member in a camera body by means of a stepped screw 2 inserted through the stepped hole 1a bored in the center of the helical gear 1, so that the helical gear 1 can rotate freely. A compression spring 3 for giving a load torque is firmly interposed between the bottom of the helical gear 1 and a frictional plate 4.

As mentioned above, the helical gear 1 is given a certain load torque by the compression spring 3, and mounted in the base 103 or the locking member in a camera body by means of the stepped screw 2 so that the helical gear 1 can rotate freely.

An idle gear 5 serving as a first helical gear engages with the helical gear 1 as well as a helical gear section 7a to be described later. The idle gear 5 has a through hole 5b whose upper portion is formed as a stepped hole 5a. Similar to the helical gear 1, the idle gear 5 is mounted in the base 103 (See FIGS. 4 and 5) or the locking member in a camera body by means of a stepped screw 6.

A first pulley gear 7 serving as a first gear is located above the helical gear 1 in such a manner that the center axis of the first pulley gear 7 aligns with the center axis of the helical gear 1. The first pulley gear 7 is composed of the helical gear section 7a and a pulley section 7b formed on the top of the helical gear section 7a as part of the helical gear section 7a. The helical gear section 7a is formed on the outer circumferential surface of the lower part of the first pulley gear 7 having a larger diameter. The pulley section 7b having teeth for seizing a timing belt 25 that will be described later is formed on the outer circumferential surface of the short cylindrical part of the first pulley gear 7 having a smaller diameter.

In the first pulley gear 7, a step formed by the helical gear section 7a and pulley section 7b is designed to prevent the timing belt 25 engaging with the pulley section 7b from coming off. The helical gear section 7a is positioned so that it engages with the idle gear 5. The forward or reverse rotation of the first pulley gear 7 is transmitted to the helical gear 1 via the idle gear 5 all the time.

A through hole 7c is bored in the center of the first pulley gear 7. The through hole 7c is designed to support a spool drive shaft 9, which drives a spool (not shown) in a film cassette, without creating a backlash so that the spool drive shaft 9 can rotate freely. A shaft section 9a that is a lower part of the spool drive shaft 9 is fitted in the through hole 7c. An annular plane 7f is formed along the rim of the hole 7c. On the annular plane 7f, the bottom of a large-diameter flange 9c of the spool drive shaft 9 rotates while sliding. Four cams 7d constituting a first clutch means are formed equidistantly on the wall around the annular plane 7f. When viewed from the top of the first pulley gear 7, the cams 7d outline a pinwheel. When the spool drive shaft 9 is assembled and set in position, balls 8 constituting the first clutch means are arranged in spaces between the circumferential surface 9d of the large-diameter flange 9c and the cams 7d.

A small-diameter shaft 9b is formed as the lowest part of the spool drive shaft 9. The small-diameter shaft 9b penetrates through the first pulley gear 7 and is locked in the through hole 12a in the center of the clutch plate 12 lying below the gear 7 by means of an adhesive or deposition. The spool drive shaft 9 is supported in such a manner that it can rotate freely relative to the helical gear section 7a. Fit of the spool drive shaft 9 is attained by adopting molding. When the circumferential surface of the spool drive shaft 9 is chamfered, the spool drive shaft 9 is fitted in the first pulley gear 7 smoothly. A fork 9e to be coupled with a spool in a film cassette is formed in the top of the spool drive shaft 9.

Four screw holes 7e are bored equidistantly on the top of the first pulley gear 7. Four screws 11 are inserted in the screw holes 7e via four through holes 10a bored in a disk 10, thus securing the disk 10. When secured, the disk 10 cooperates with the step in the first pulley gear 7 in preventing the timing belt 25 from coming off.

When the first pulley gear 7 having the foregoing structure rotates clockwise in FIG. 1, spaces are created between the balls 8 and cams 7d. No driving force is therefore transmitted to the spool drive shaft 9. When the first pulley gear 7 rotates counterclockwise in FIG. 1, the cams 7d push the balls 8 against the outer circumferential surface 9d of the spool drive shaft 9. Thus, the cams 7d and balls 8 constitute a one-way clutch, which serves as the first clutch means, for transmitting a driving force.

Using the one-way clutch, a film transport mechanism is realized with the components shown in FIG. 2. To be more specific, a spool 20a about which film is wound with a trailer thereof connected is attached to a center axis of a film cassette 20. The spool 20a is bared in the top and bottom of the film cassette 20. At one of the bared ends of the spool 20a, a coupler is formed. The coupler is coupled with the fork 9e formed as the upper end of the spool drive shaft 9, whereby the spool 20a is driven and rotated in order to feed film from the film cassette or rewind the film into the film cassette.

The disk 10, first pulley gear 7, idle gear 5, and helical gear 1, which are described in conjunction with FIG. 1, are assembled below a film cassette chamber in a camera. The fork 9e projects into the chamber.

In a film take-up chamber in a camera, a drive motor 21 lies with the output shaft thereof facing down. A pinion gear 22 is attached to the output shaft. A gear 23a that is an upper one of first stepwise gears is engaged with the pinion gear 22. A gear 23b that is a lower one of the first stepwise gears engages with a second pulley gear 24. The timing belt 25 stretches between the second pulley gear 24 and first pulley gear 7, thus transmitting a rotational driving force.

The gear 23a of the first stepwise gears serves as a sun gear in a planetary clutch mechanism provided as a film spool driving means. A planetary gear 26 supported by a coupling plate 27 engages with the gear 23a. The planetary gear 26 also engages with a gear 28a that is a lower one of second stepwise gears 28. A gear 28b that is an upper one of the second stepwise gears 28 engages with a gear 29b formed on the circumferential surface of the bottom of a film take-up spool 29 provided as a film spool, thus transmitting a rotational driving force.

The film take-up spool 29 has a bossy claw 29a on the lower circumferential surface. The claw 29a hooks a perforation in film so as to wind the film about the spool 29.

Next, the movements for feeding or rewinding film to be made in the thus structured film transport mechanism for a camera of an embodiment of the present invention will be described in conjunction with FIG. 2.

The film cassette 20 is mounted, and the spool 20a is coupled with the fork 9e. Thereafter, when the drive motor 21 rotates counterclockwise in FIG. 2, the planetary gear 26 in the planetary gear train rotates counterclockwise. This causes the film take-up spool 29 to rotate counterclockwise via the second stepwise gears 28a and 28b and the gear 29b.

On the other hand, the gear 23b of the first stepwise gears transmits the counterclockwise rotational motion of the pinion gear 22 to the second pulley gear 24. The second pulley gear 24 therefore rotates counterclockwise. This causes the first pulley gear 7 to rotate counterclockwise. The one-way clutch then works to rotate the spool drive shaft 9 counterclockwise. Eventually, the spool 20a in the film cassette 20 rotates in a direction permitting film feed.

Film is then fed from the film cassette 20. The fed film leader is wound up about the take-up spool 29. In other words, after the film stowed in the cassette is further fed from the cassette, when the film reaches the film take-up spool 29, any of the perforations bored outside an area to be exposed in the film are hooked by the bossy claw 29a formed on the circumferential surface of the film take-up spool 29 rotating counterclockwise. At the same time, the film is wound about the film take-up spool 29 by means of a film presser roller (not shown).

The spool drive shaft 9 is designed to provide a higher speed reduction ratio for a driving speed of the motor 21 than the film take-up spool 29. When film is hooked by the bossy claw 29a on the film take-up spool 29, the film transport speed increases. In other words, the spool drive shaft 9 rotates at a higher speed than the first pulley gear 7. This disconnects transmission of a driving force by the one-way clutch. After being wound about the film take-up spool 29, the film is fed by the driving force of the take-up spool 29.

With the counterclockwise rotation of the first pulley gear 7, the idle gear 5 rotates clockwise. The helical gear 1 rotates counterclockwise owing to the idle gear 5. A load torque is applied to the helical gear 1 by means of the compression spring 3. A force enabling displacement in an axial direction is exerted by the teeth of the helical gear 1. The gear 1 is therefore displaced downward in FIG. 2.

Next, movements made for rewinding film will be described in conjunction with FIG. 3.

When the drive motor 21 rotates clockwise, the driving force is transmitted to the gear 23a, which is the upper one of the first stepwise gears, by the pinion gear 22. This causes the coupling plate 27 attached to the planetary gear 26 to turn counterclockwise. The planetary gear 26 is therefore decoupled from the gear 28a of the second stepwise gears.

The film take-up spool 29 is then freed. The second pulley gear 24 rotates clockwise owing to the gear 23b that is the lower one of the first stepwise gears. A rotational driving force transmitted by the timing belt 25 rotates the first pulley gear 7 clockwise. However, the spool drive shaft 9 is decoupled from the first pulley gear 7 by the one-way clutch in the first pulley gear 7.

The first pulley gear 7 rotates the idle gear 5 counterclockwise and the helical gear 1 clockwise. At this time, since the load torque is applied to the helical gear 1, a vertical component of force is exerted in line with the direction in which the gear 1 is toothed (twisted). With the vertical component of force, the helical gear 1 is displaced upward. The projections 1b on the helical gear 1 are, as described in conjunction with FIG. 1, fitted in the four recesses 12b formed along the outer circumference in the bottom of the clutch plate 12. The clutch plate 12 then rotates.

The small-diameter shaft 9b that is the lowest part of the spool drive shaft 9 is locked in the hole 12a in the center of the clutch plate 12. The drive shaft 9 therefore rotates clockwise. Being coupled with the spool 20a stowed in the film cassette 20, the drive shaft 9 rotates the spool 20a clockwise. Film is therefore wound into the film cassette 20.

Figure 4:
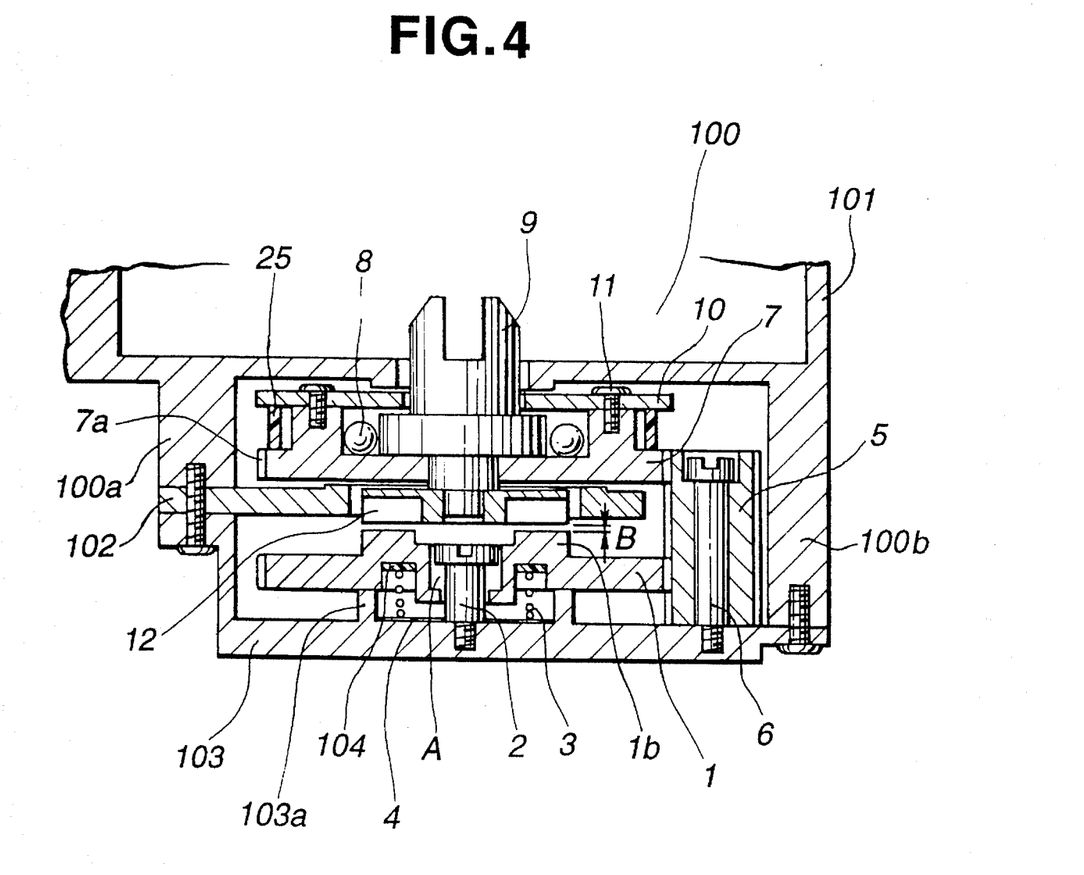
FIG. 4 is an enlarged longitudinal sectional view showing major components of the spool drive mechanism in FIG. 1 which is feeding film.

FIG. 4 is a sectional view showing in detail major components disposed in the vicinity of the first pulley gear 7, which serves as a spool drive mechanism, in the film transport mechanism for a camera of the embodiment. In FIG. 4, the components have made movements for feeding or rewinding film as shown in FIG. 2.

In FIG. 4, a cassette chamber 100 in which the film cassette 20 is mounted and stowed is formed in a camera body 101. Projections 100a and 100b are formed in the space under the cassette chamber 100 in the camera body 101. A unit base 103 is screwed to the projections 100a and 100b with a middle base 102 for receiving the first pulley gear 7 between them. The idle gear 5 is mounted in the unit base 103 screwed to the projections by means of a stepped screw 6.

The helical gar 1 has a recess, in which an annular frictional plate 104 is embedded, in the center of the bottom thereof. The compression spring 3 whose upper end is pressing itself against the frictional plate 104 has the lower end thereof rested against the unit base 103 with another frictional plate 4 between them. The compression spring 3 gives a load torque to the helical gear 1.

The helical gear 1 is mounted in the unit base 103 by means of the stepped screw 2 so that the helical gear 1 can rotate freely. The clutch plate 12 locked by the small-diameter shaft 9b that is the lowest part of the spool drive shaft 9 is, as described in conjunction with FIG. 1, located coaxially above the helical gear 1.

The other components are identical to those described in conjunction with FIG. 1. For feeding film, when the first pulley gear 7 rotates counterclockwise in FIG. 3 owing to the timing belt 25, the rotational driving force is transmitted from the helical gear section 7a, which is formed on the outer circumferential surface of the lower part of the first pulley gear 5 having a large diameter, through the idle gear 5 to the helical gear 1. With the force enabling downward displacement which is exerted by the teeth of the helical gear 1, the helical gear 1 is displaced downward as shown in FIG. 4. The helical gear 1 then abuts on an annular projection 103a resting on the unit base 103, and continues to rotate.

At this time, there is a gap B between the projections 1b on the helical gear 1 and the bottom of the clutch plate 12.

There also is a clearance A between the helical gear 1 and a collar of the stepped screw 2. The rotational driving force of the helical gear 1 is therefore not transmitted to the spool drive shaft 9.

Figure 5:
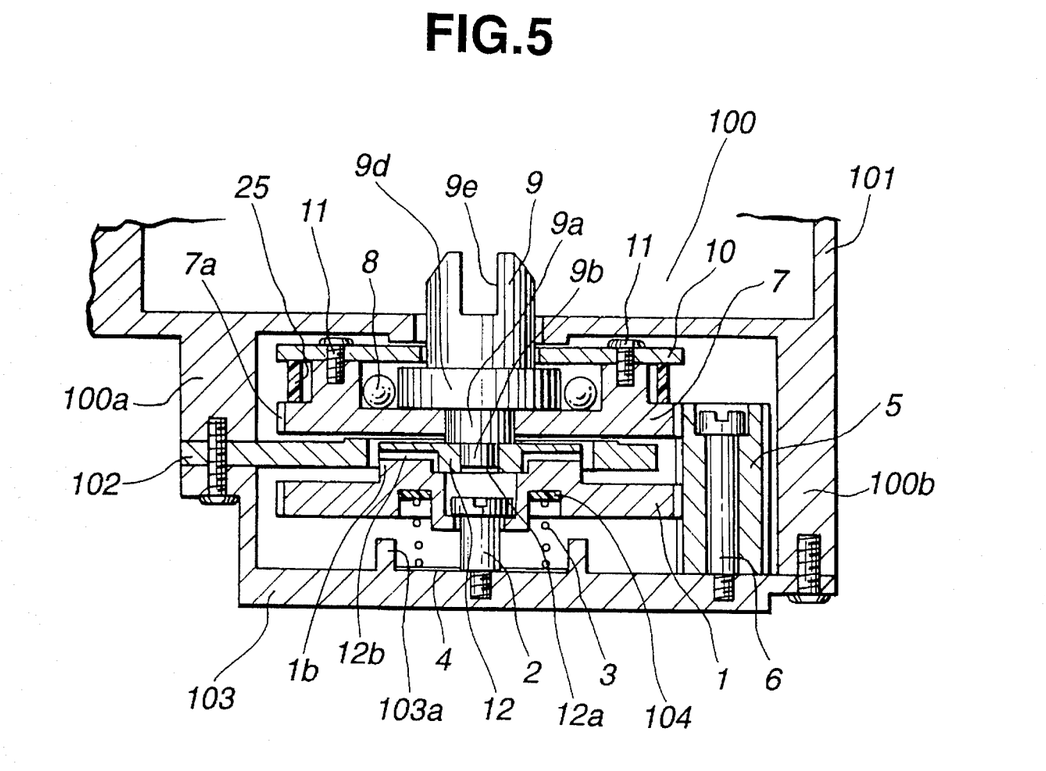
FIG. 5 is an enlarged longitudinal sectional view showing major components of the spool drive mechanism in FIG. 1 which is rewinding film.

FIG. 5 is, similar to FIG. 4, a sectional view showing the major components in the vicinity of the first pulley gear 7, which serves as the spool drive mechanism, in the film transport mechanism for a camera of the embodiment. The components are placed in a state for rewinding film.

In FIG. 5, when the first pulley gear 7 rotates counterclockwise, the helical gear 1 to which the rotational driving force is transmitted via the idle gear 5 also rotates counterclockwise. As mentioned above, a load torque is applied to the helical gear 1 by the compression spring 3. A component of force oriented in an axial direction is exerted by the teeth of the helical gear 1, whereby a force enabling upward displacement works on the helical gear 1. The helical gear 1 therefore moves up while rotating. The projections 1b on the helical gear 1 are therefore fitted into the recesses 12b in the clutch plate 12 in the axial direction.

As described previously, the first pulley gear 7 and spool drive shaft 9 are disconnected from each other by the one-way clutch so that a rotational driving force is not transmitted between them. In this state, the clockwise rotational driving force provided by the first pulley gear 7 is transmitted to the spool drive shaft 9 via the helical gear 1. Eventually, the spool 20a stowed in the cassette 20 rotates clockwise to rewind film.

When the helical gear 1 goes up, film moves neither in a direction permitting film feed nor in a direction permitting film rewind for a duration after the drive motor 21 starts rotating clockwise until the helical gear 1 engages with the clutch plate 12. As for film rewind, after it is detected at the completion of photography that no signal is sent from a film transport detecting means (not shown), automatic rewind is executed. Even when rewind is performed manually, the above duration poses no problem for practical use.

Figure 6:
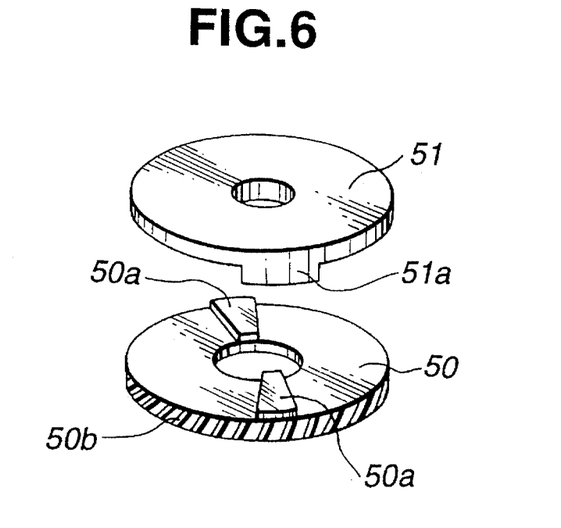
FIG. 6 is an oblique view showing a variant of clutch elements in the film drive mechanism in the camera shown in FIG. 1.

FIG. 6 shows a variant of the shapes of the projections 1b on the helical gear 1 serving as the second clutch means in the camera of the embodiment and of the recesses 12b in the clutch plate 12 therein. A structure in which the variant is implemented will be described below.

A helical gear section 50b is formed on the outer circumferential surface of a helical gear 50 serving as a second gear and corresponding to the helical gear 1. Two sector-shaped projections 50a constituting a second clutch means are formed on mutually opposite sides on the top of the helical gear 50 in such a manner that the sectors fan out radially.

A hollow projection 51a that is also contoured like a sector is formed at a position opposed to one of the sector-shaped projections 50a on the bottom of a clutch plate 51 constituting the second clutch means. Similar to the aforesaid embodiment, the helical gear 50 moves up so that one of the projections 50a on the helical gear 50 is caught in the hollow projection 51a.

In the variant relating to the above structure, when the helical gear 50 is displaced upward and one of the projections 50a on the helical gear 50 is caught in the hollow projection 51a on the clutch plate 51, such a drawback that the projection 50a on the helical gear 50 is repelled by the edge of the hollow projection 51a on the clutch plate 51 but not caught in the hollow projection successfully will not take place. One of the projections is caught in the hollow projection successfully. The variant provides outstandingly improved reliability compared with a prior art design in which gears are engaged with each other in order to transmit a driving force.

In the embodiment of the present invention described in conjunction with FIG. 1, the projections 1b on the helical gear 1 have a somewhat smaller width than the recesses 12b in the clutch plate 12, so that the projections 1b on the helical gear 1 are fitted into the recesses 12b in the clutch plate 12 with backlashes present. This structure provides the same advantage as that mentioned above. This kind of a dimensional relationship between components or a shape of clutch elements must be determined in consideration of a film rewind speed and a vertical movement speed of the helical gear 1, so that high reliability can be offered.

In the aforesaid embodiment of the present invention, a reduction ratio in film feed speed and a reduction ratio in film rewind speed are described to be dependent on the idle gear 5 alone but not on a stepped gear. Either of the reduction ratios may be made larger or smaller freely by modifying the toothing of the idle gear 5.

Furthermore, in this embodiment, two one-way clutch mechanisms are realized using part of the spool drive shaft 9. Alternatively, the one-way clutch mechanisms may be designed as part of any driving system other than the drive shaft 9.

As described so far, according to the present invention, one-way clutches are used to change directions of rotation made by a drive motor. This obviates a necessity of drastically modifying the structure of a conventional film transport mechanism and still provides a mechanism for feeding, winding, and rewinding film that ensures accurate movements and offers high reliability. Moreover, the number of components can be reduced by utilizing molded components. This results in a simple structure, a compact design, and low production cost.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A camera having a spool driving means for feeding film loaded in a cassette out of said cassette by rotating a spool, comprising:

a motor selectively rotatable in either of two opposing directions;

a spool drive shaft to be coupled with said spool;

a first gear for ejecting said film from said cassette on receipt of a driving force generated by said motor;

a first clutch means that when said motor rotates in a first direction, couples said first gear with said spool drive shaft so that said film is ejected from said cassette;

a second gear for winding said film into said cassette on receipt of a driving force generated by said motor; and a second clutch means that when said motor rotates in a second direction, couples said second gear with said spool drive shaft via said first gear so that said film is wound into said cassette, said first and second clutch means having their axes being disposed coaxial with an axis of said spool drive shaft.

2. A camera according to claim 1, wherein said second clutch means includes a first helical gear and a second helical gear that engages with said first helical gear, and said first helical gear engages with said first gear.

3. A camera according to claim 1, wherein said spool drive shaft, first gear and second gear are disposed coaxially to one another.

4. A camera according to claim 1, further comprising:
a film take-up spool for taking up film fed from said cassette; and
a film take-up spool driving means that drives said film spool on receipt of a rotational driving force in a first direction and generated by said motor, and that when said motor rotates in a second direction, does not transmit the driving force to said film spool.

5. A camera according to claim 4, including drive ratio means arranged between said motor and one of said spool drive shaft and said spool driving means so that rotation of said film spool driving means is greater than rotation of said spool drive shaft whereby said first clutch means decouples drive from said spool drive shaft when a film fed from a film cassette driven by said spool drive shaft is wound about said film take-up spool.

6. A camera according to claim 4, wherein said film take-up spool driving means and said first gear each include a timing gear; and
a timing belt entrained about said timing gears for coupling drive from said motor to said first gear.

7. A camera according to claim 1, wherein said first gear further comprises a helical gear integral with said first gear;
said second gear including a helical gear; and
a third gear comprising a helical gear meshing with said first gear helical gear and said second gear helical gear for transmitting drive from said first gear to said second gear.

8. A camera according to claim 1, wherein said first clutch means comprises:
a plurality of cams arranged at equi-spaced intervals about a flange of said spool drive shaft; and
members each having an annular surface associated with each cam and arranged between its associated cam and said flange, whereby rotation of said first gear only in said first direction transmits driving force to said spool drive shaft.

9. A camera having a spool driving means for feeding film loaded in a cassette out of said cassette by rotating a spool, comprising:
a motor selectively rotatable in either of two opposing directions;
a spool drive shaft to be coupled with said spool;
a first gear for ejecting said film from said cassette on receipt of a driving force generated by said motor;
a first clutch means that when said motor rotates in a first direction, couples said first gear with said spool drive shaft so that said film is ejected from said cassette;
a second gear for winding said film into said cassette on receipt of a driving force generated by said motor; and
a second clutch means that when said motor rotates in a second direction, couples said second gear with said spool drive shaft via said first gear so that said film is wound into said cassette;
said second clutch means comprising:
a clutch plate secured to said spool drive shaft;
one of said clutch plate and said second gear having projections and the other of said clutch plate and said second gear having at least one recess for receiving one of said projections;
means for normally urging said second gear in a direction to move one of said projections into said recess to rotate said spool drive shaft; and
means for displacing said second gear from said clutch plate against the force of said urging means responsive to rotation of said motor in a direction to unwind said film.

10. A camera according to claim 9, wherein said means for displacing said second gear comprises a rotatably mounted helical gear driven by said first gear and meshing with a helical gear arranged about a circumference of said second gear.

11. A camera according to claim 9, wherein said projections are elongated projections extending radially outward from a common axis of rotation of said clutch plate and second gear; and
said recess being radially aligned and having a shape conforming to said projections.

12. A camera according to claim 11, wherein said projections have a tapered configuration extending radially outwardly from a common axis of rotation of said clutch plate and second gear; and
said recess being arranged in a projection provided on said one of said clutch plate and second gear.

13. A camera according to claim 12, wherein two tapered projections are provided, said tapered projections being arranged along a common diameter extending through said common axis of rotation; and
said recess being radially aligned and having a shape conforming to said projections for selective engagement with one of said projections.

14. A camera, comprising:
a spool drive shaft to be driven in a direction causing film to be pushed out of a film cassette and in a direction causing film to be rewound into said film cassette;
a motor for generating a driving force;
a first driving force transmitting means including a first clutch means which transmits a driving force generated by said motor to said spool drive shaft so that said spool drive shaft is driven in a direction causing film to be pushed out of said film cassette; and
a second driving force transmitting means including a second clutch means which transmits a driving force generated by said motor to said spool drive shaft so that said spool drive shaft is driven in a direction causing film to be rewound into said film cassette, said spool drive shaft, and first and second clutch means being coaxially aligned.

15. A camera according to claim 14, wherein said first clutch means operates when said motor rotates in a forward direction, and said second clutch means operates when said motor rotates in a reverse direction.

16. A camera, comprising:
a spool drive shaft to be selectively driven in a first direction causing film to be pushed out of a film cassette and a second direction causing film to be rewound into said film cassette;
a motor for generating a driving force;
a first driving force transmitting means including a first clutch means which transmits a driving force generated by said motor to said spool drive shaft so that said spool drive shaft is driven in a direction causing film to be pushed out of said film cassette; and
a second driving force transmitting means including a second clutch means which transmits a driving force generated by said motor to said spool drive shaft so that said spool drive shaft is driven in a direction causing film to be rewound into said film cassette said spool drive shaft and said first and second clutch means being coaxially aligned; wherein:

when said first driving force transmitting means makes a movement, said second clutch means does not operate; and when said second driving force transmitting means makes a movement, said first clutch means does not operate.

17. A camera having a spool driving means for pushing film loaded in a cassette out of said cassette by rotating a spool, comprising:

a motor having an output selectively rotatable in either of two opposing directions;

a spool drive shaft for coupling with a spool of a cassette when a cassette is loaded into the camera;

a first gear rotatable in a first direction for ejecting film from said cassette upon receipt of a driving force generated by said motor, said first gear being coaxial with said spool drive shaft;

first clutch means arranged between said first gear and said spool drive shaft for coupling drive from said first gear to said spool drive shaft when said motor output is rotated in a first direction;

a second gear coaxial with said first gear and said spool drive shaft for winding film into said cassette when receiving a driving force from said motor output in a second direction opposite said first direction; and second clutch means coaxial with said second gear and said spool drive shaft for decoupling said second gear from said spool drive shaft when said motor output is driven in said first direction and for coupling said second gear with said spool drive shaft when said motor is rotated in said second direction;

said first clutch means decoupling said spool drive shaft from said first gear when said motor output is rotated in said second direction.

18. A camera having a spool driving means for pushing a film loaded in a cassette out of said cassette by rotating a spool, comprising:

first and second gears being coaxially disposed;

said first gear having a first gear portion driven by a motor and a second helical gear portion meshing with a third helical gear;

said second gear being a helical gear meshing with said third helical gear;

first clutch means for coupling said first gear to said spool driving means when said first gear is rotated in a first direction and for decoupling said spool driving means from said first gear when said first gear is rotated in a second direction opposite said first direction;

second clutch means including a first clutch plate coupled to said drive spool shaft;

one surface of said second helical gear comprising a cooperating second clutch plate;

said second helical gear being normally urged to move the second clutch plate against the first clutch plate for driving said spool drive shaft when said motor is rotated in said second direction and being axially moved away from said first clutch plate by said third helical gear when said first gear is rotated in said first direction.

* * * * *